United States Patent
Gester et al.

(10) Patent No.: US 12,350,852 B2
(45) Date of Patent: Jul. 8, 2025

(54) POLYMERIC CUTTING EDGE STRUCTURES AND METHOD OF MANUFACTURING POLYMERIC CUTTING EDGE STRUCTURES

(71) Applicant: The Gillette Company LLC, Boston, MA (US)

(72) Inventors: Matthias Gester, Farnborough (GB); Roman Kiyan, Hannover (DE); Ulf Hinze, Garbsen (DE); Kestutis Kurselis, Garbsen (DE); Graham John Simms, Reading (GB)

(73) Assignee: The Gillette Company LLC, Boston, MA (US)

( * ) Notice: Subject to any disclaimer, the term of this patent is extended or adjusted under 35 U.S.C. 154(b) by 209 days.

(21) Appl. No.: 16/737,300

(22) Filed: Jan. 8, 2020

(65) Prior Publication Data
US 2020/0198163 A1    Jun. 25, 2020

Related U.S. Application Data

(62) Division of application No. 15/195,137, filed on Jun. 28, 2016, now Pat. No. 10,562,200.

(51) Int. Cl.
*B26B 21/60* (2006.01)
*B26B 21/40* (2006.01)
(Continued)

(52) U.S. Cl.
CPC .......... *B26B 21/60* (2013.01); *B26B 21/4068* (2013.01); *B26B 21/58* (2013.01);
(Continued)

(58) Field of Classification Search
CPC ......... B26B 21/54; B26B 21/58; B26B 21/60; B26B 21/528; B26B 21/4068;
(Continued)

(56) References Cited

U.S. PATENT DOCUMENTS

| | | | |
|---|---|---|---|
| 3,035,344 A | 5/1962 | Brown | |
| 4,041,476 A | 8/1977 | Swainson | |

(Continued)

FOREIGN PATENT DOCUMENTS

| | | |
|---|---|---|
| CN | 103011058 B | 3/2015 |
| CN | 204451225 U | 7/2015 |

(Continued)

OTHER PUBLICATIONS

Femtosecond Laser-Induced Document—Mar. 1, 2003/vol. 28, No. 5/ Optics Letters 2PP Article.

(Continued)

*Primary Examiner* — Adam J Eiseman
*Assistant Examiner* — Richard D Crosby, Jr.
(74) *Attorney, Agent, or Firm* — Andres E. Velarde

(57) ABSTRACT

A functional polymeric cutting edge structure and methods for the manufacturing of cutting edge structures comprised of polymeric materials are provided. The cutting edge structures may be produced on a substrate having a blade body or blade support type. The polymeric material is produced by curing a precursor material by electromagnetic radiation wherein a wavelength of said radiation is about double a wavelength required to cure the precursor material. A razor blade for use in a razor cartridge or a blade box may be formed using the present invention.

13 Claims, 8 Drawing Sheets

(51) Int. Cl.
- *B26B 21/58* (2006.01)
- *B29C 64/135* (2017.01)
- *B29C 64/40* (2017.01)
- *B29K 105/00* (2006.01)
- *B29L 31/00* (2006.01)
- *B29L 31/28* (2006.01)
- *B33Y 10/00* (2015.01)
- *B33Y 80/00* (2015.01)

(52) U.S. Cl.
CPC ............ *B29C 64/135* (2017.08); *B29C 64/40* (2017.08); *B33Y 10/00* (2014.12); *B33Y 80/00* (2014.12); *B29K 2105/0058* (2013.01); *B29L 2031/286* (2013.01); *B29L 2031/72* (2013.01)

(58) Field of Classification Search
CPC .............. B26B 21/4075; B26B 19/384; B26B 19/3893; B33Y 10/00
See application file for complete search history.

(56) References Cited

U.S. PATENT DOCUMENTS

| | | | |
|---|---|---|---|
| 4,575,330 A * | 3/1986 | Hull | G09B 25/02 425/174.4 |
| 4,879,073 A | 11/1989 | Kromrey | |
| 5,426,851 A | 6/1995 | Gilder et al. | |
| 5,782,852 A | 7/1998 | Foggia et al. | |
| 5,876,550 A * | 3/1999 | Feygin | G05B 19/41 156/264 |
| 6,044,566 A | 4/2000 | Ries et al. | |
| 6,117,612 A * | 9/2000 | Halloran | G03F 7/0037 430/269 |
| 6,133,336 A | 10/2000 | Popat et al. | |
| 6,364,986 B1 * | 4/2002 | Kieronski | B29C 39/42 156/242 |
| 6,379,324 B1 | 4/2002 | Gartstein et al. | |
| 6,439,874 B1 | 8/2002 | Buzzeo et al. | |
| 6,441,338 B1 * | 8/2002 | Rabinovich | B26F 1/44 219/121.64 |
| 6,671,961 B1 * | 1/2004 | Santhagens Van Elbergen | B26B 21/227 30/50 |
| 6,713,772 B2 | 3/2004 | Goodman et al. | |
| 7,778,723 B2 | 8/2010 | Cregger | |
| 8,327,546 B2 | 12/2012 | Tucker et al. | |
| 8,530,118 B2 | 9/2013 | Devoe et al. | |
| 8,642,122 B2 | 2/2014 | Wang et al. | |
| 8,858,807 B2 | 10/2014 | Devoe et al. | |
| 8,889,050 B2 | 11/2014 | Nitsch | |
| 9,199,384 B2 | 12/2015 | Gringer et al. | |
| 9,211,480 B2 | 12/2015 | Lu | |
| 9,227,331 B2 | 1/2016 | Zhuk et al. | |
| 9,463,395 B2 | 10/2016 | Lu | |
| 10,518,429 B2 | 12/2019 | Gester et al. | |
| 10,562,200 B2 * | 2/2020 | Gester | B33Y 80/00 |
| 11,597,112 B2 | 3/2023 | Gester et al. | |
| 2002/0151393 A1 | 10/2002 | Liechty | |
| 2004/0187644 A1 | 9/2004 | Peterlin et al. | |
| 2005/0126016 A1 | 6/2005 | Branden | |
| 2006/0196054 A1 | 9/2006 | Luxton | |
| 2007/0191761 A1 | 8/2007 | Boone et al. | |
| 2008/0086888 A1 | 4/2008 | Scheinfeld | |
| 2009/0038166 A1 * | 2/2009 | Crichton | B26B 19/044 30/346.51 |
| 2009/0099537 A1 * | 4/2009 | DeVoe | A61M 37/0015 430/320 |
| 2009/0211690 A1 * | 8/2009 | Bartholomeusz | B26D 7/2628 156/64 |
| 2009/0218196 A1 | 9/2009 | Groenvall et al. | |
| 2009/0320299 A1 | 12/2009 | Kuhn et al. | |
| 2010/0011911 A1 * | 1/2010 | Aalto | C22C 38/12 76/115 |
| 2010/0021647 A1 | 1/2010 | Sitti et al. | |
| 2010/0178493 A1 | 7/2010 | Wang et al. | |
| 2010/0276829 A1 | 11/2010 | Yang et al. | |
| 2010/0278480 A1 * | 11/2010 | Vasylyev | G03B 21/2066 385/33 |
| 2010/0287781 A1 | 11/2010 | Skrobis | |
| 2010/0319204 A1 * | 12/2010 | Peterson | B29C 64/153 30/346.58 |
| 2011/0033887 A1 | 2/2011 | Fang et al. | |
| 2011/0042847 A1 | 2/2011 | Ogawa et al. | |
| 2011/0127690 A1 | 6/2011 | Honda et al. | |
| 2011/0208256 A1 * | 8/2011 | Zuhars | A61F 2/30756 606/86 R |
| 2012/0000074 A1 | 1/2012 | Pazosschroeder | |
| 2012/0060379 A1 * | 3/2012 | Culf | C23C 28/021 30/350 |
| 2012/0330449 A1 * | 12/2012 | Edwards | B26D 5/00 700/97 |
| 2013/0008036 A1 | 1/2013 | Gringer et al. | |
| 2013/0012612 A1 | 1/2013 | Houbertz-krauss et al. | |
| 2013/0014395 A1 * | 1/2013 | Patel | B26B 21/56 30/346.54 |
| 2013/0014396 A1 * | 1/2013 | Skrobis | B26B 21/56 30/346.54 |
| 2013/0087942 A1 | 4/2013 | Kimishima | |
| 2013/0315530 A1 | 11/2013 | La Porta et al. | |
| 2014/0033538 A1 | 2/2014 | Peterson et al. | |
| 2014/0066843 A1 | 3/2014 | Zhang et al. | |
| 2014/0360021 A1 | 12/2014 | Sonnenberg et al. | |
| 2015/0030642 A1 | 1/2015 | Wu et al. | |
| 2015/0166394 A1 * | 6/2015 | Marjanovic | C03B 23/02 428/43 |
| 2015/0328789 A1 | 11/2015 | Skrobis et al. | |
| 2016/0067922 A1 * | 3/2016 | Voris | B29C 64/40 264/401 |
| 2016/0114530 A1 * | 4/2016 | Thiel | B29C 64/273 264/401 |
| 2016/0167241 A1 | 6/2016 | Goldfarb | |
| 2016/0355365 A1 | 12/2016 | Werner | |
| 2017/0001324 A1 | 1/2017 | Gester et al. | |
| 2017/0368703 A1 | 12/2017 | Gester | |
| 2017/0368704 A1 | 12/2017 | Gester et al. | |
| 2018/0194017 A1 | 7/2018 | Tseo | |
| 2018/0215861 A1 | 8/2018 | Fujikawa et al. | |
| 2018/0250851 A1 | 9/2018 | Ogawa et al. | |
| 2020/0086517 A1 | 3/2020 | Gester et al. | |
| 2020/0406486 A1 | 12/2020 | Gester et al. | |

FOREIGN PATENT DOCUMENTS

| | | | |
|---|---|---|---|
| CN | 104960202 A | 10/2015 | |
| DE | 10111422 A1 | 9/2002 | |
| GB | 2310819 | 9/1997 | |
| GB | 2310819 A * | 9/1997 | ............ B26B 21/58 |
| JP | H0316705 A | 1/1991 | |
| JP | H0699505 A | 4/1994 | |
| JP | 2005267746 A | 9/2005 | |
| JP | 2009241358 A | 10/2009 | |
| JP | 2011007818 A | 1/2011 | |
| JP | 4817554 B2 | 9/2011 | |
| JP | 2014166352 A | 9/2014 | |
| JP | 2015100659 A | 6/2015 | |
| WO | 2014108538 A2 | 7/2014 | |
| WO | 2015074088 A3 | 7/2015 | |

OTHER PUBLICATIONS

International Search Report and Written Opinion; Application Ser. No. PCT/US2017/039354; dated Sep. 19, 2017, 13 pages.
All Office Actions, U.S. Appl. No. 15/188,123.
All Office Actions, U.S. Appl. No. 15/195,157.
All Office Actions, U.S. Appl. No. 15/195,137.
All Office Actions, U.S. Appl. No. 15/188,100.
All Office Actions. U.S. Appl. No. 16/997,178.
All Office Actions. U.S. Appl. No. 16/697,150.
Brick In The Yard Mold Supply: "Mold 1.2.4,5,Making Tutor i a l: Cut Block Mold", 7-11youtube.

(56) References Cited

OTHER PUBLICATIONS

Jaime Werkmeister et al: "AnisotropicEtching of Silicon as a Tool for Creatinginjection Molding Tooling Surfaces",Journal of Hicroelectromechanical Systems.IEEE Service Center. US, vol. 15. No. 6,Dec. 1, 2006 (Dec. 1, 2006 ), pages.

Aleksandra Delplanque et al, "UV/ozone surface treatment increases hydrophilicity and enhances functionality of SU-8 photoresist polymer", Applied Surface Science, vol. 314, URL: https://www.sciencedirect.com/science/article/pii/S0169433214013385, Sep. 4, 2014, 15 pages.

Huntsman Araldite GY 281 Bisphenol F Epoxy Resin, Songhan, Plastic technology Co., Ltd., printed out Apr. 21, 2023, 1 page.

Non-Final Office Action: U.S. Appl. No. 17/336,923 dated Aug. 18, 2022, 06 pages.

Notice of Allowance; U.S. Appl. No. 17/336,923 dated Jan. 10, 2023, 07 pages.

* cited by examiner

POLYMERIC CUTTING EDGE STRUCTURES AND METHOD OF MANUFACTURING POLYMERIC CUTTING EDGE STRUCTURES

FIELD OF THE INVENTION

This invention relates to shaving razors and methods of manufacturing cutting edge structures, and more particularly to manufacturing cutting edge structures such as shaving razor blades from a polymeric material.

BACKGROUND OF THE INVENTION

Razor blades are typically formed of a suitable metallic sheet material such as stainless steel, which is slit to a desired width and heat-treated to harden the metal. The hardening operation utilizes a high temperature furnace, where the metal may be exposed to temperatures greater than about 1000° C. for up to about 20 seconds, followed by quenching, whereby the metal is rapidly cooled to obtain certain desired material properties.

After hardening, a cutting edge is formed generally by grinding the blade. The steel razor blades are mechanically sharpened to yield cutting edges that are sharp and strong to cut through hair over an extended period of time. The continuous grinding process generally limits blade shapes to have straight edges with a substantially triangular or wedge shape profile (e.g., cross section). The cutting edge wedge-shaped configuration typically has an ultimate tip with a radius less than about 1000 angstroms.

The advantage of this prior method is that it is a proven, economical process for making blades in high volume at high speed. It would be particularly desirable if such a process could utilize lower cost materials for blade formation and also enable cutting edged profiles other than substantially triangular.

Blades with cutting edges made from a polymeric material are disclosed for disposable cutlery or disposable surgical scalpels (e.g., U.S. Pat. Nos. 6,044,566, 5,782,852). Razor blades made from polymeric material are disclosed in GB2310819A. The disadvantage of any of the prior art polymer blades is that the process of making such plastic blades is not cost-effective for mass production nor suitable to create a cutting edge with a tip radius of less than 1 μm as required for cutting hair.

Generally, the prior art utilizes melt flow processing techniques. The molten polymer of the prior art is injected into a cavity of a mold tool which is typically metal, but the polymer is generally too viscous (typically exceeding 100,000 centiPoise) to fully penetrate into the sub-micro-meter (e.g., less than 1 micrometer) dimensioned spaces required in a cavity to create razor blade edges. However, choosing a lower viscosity material or increasing the injection pressure, which may benefit penetration into sub-micro-meter dimensioned spaces, causes the polymeric material to penetrate between the mating surfaces of the two halves of the mould tool, known as "flashing," and therefore the required cutting edge tip radius cannot be achieved. A decrease of viscosity of the polymeric material may also be obtained by heating the polymeric raw material above the glass transition temperature, often exceeding 200° C. Furthermore, after filling the cavity, the fluid polymeric material needs to be cooled to achieve a solid state, which causes shrinkage of the blade shape and rounding of the edge and therefore the required cutting edge tip radius cannot be achieved.

Therefore, a need exists for better processes for cutting edge structures made of polymer and more cost-effective methods of making cutting edge structures for shaving razors having required tip radius, less variability in edge quality and sharpness to provide a comparable or improved shaving experience.

It is also desirable to find materials and processes that can form cutting edge structures having any shape, such as non-linear edges and/or provide an integrated assembly.

Recently additive manufacturing techniques, such as stereo lithography and 3-dimensional printing have become widely used to fabricate polymeric structures. In both cases, a 3-dimensional object is build up from small volume elements, so-called voxels, of material that are successively added to each other until the entire object is formed. However, the spatial resolution of these techniques is limited to the size of an individual pixel of tens of micro-meters, which is greater than the ultimate tip radius of a cutting edge.

High resolution additive manufacturing, such as 2-photon polymerization (2PP) described for instance in *Photonics Spectra* Vol. 40 (2006), Issue 10, Pages 72-80, is known and its potential to create sub-micron sized objects has been demonstrated for micro-mechanical actuators (e.g., U.S. Pat. No. 7,778,723B2), micro-fluidics devices, optical elements (e.g., U.S. Pat. No. 8,530,118B2), photonic crystals (e.g., US2013/0315530A1) and bio-medical applications such as micro-needles (e.g., US Patent Publication No. 2009/099537A1, CN103011058A) and tissue engineering scaffolds (e.g., US Patent Publication No. 2013/012612A1).

All of these structures make use of high resolution additive manufacturing on very small object length scales (e.g., 1 mm or less). One disadvantage of this process is that a certain time is required to create each individual voxel and hence the overall size of the complete object determines the time required for its fabrication. Therefore, a need exists to fabricate larger objects, such as razor blades, using high resolution additive manufacturing on faster or more reasonable time scales.

Another disadvantage of high resolution additive manufacturing is that internal stresses occur due to the slight shrinkage of the polymeric material during curing. When objects with overall dimensions exceeding about 1 mm are fabricated by high resolution additive manufacturing, these internal stresses scale with size, and objects which are greater than 1 mm in size become unstable. Hence, there is a need to fabricate objects such as razor blades using high resolution additive manufacturing without internal stresses.

SUMMARY OF THE INVENTION

The present invention provides a simple, efficient method for manufacturing one or more cutting edge structures, such as razor blades from a polymeric material and a functional polymeric cutting edge structure such as a razor blade. Moreover, some methods are suitable for producing a plurality of such cutting edge structures, or "blade boxes" comprising a plurality of razor blades formed in a polymeric material to be disposed as a single unit in a razor cartridge.

The steps of the present invention process include providing a computer model of a cutting edge structure, providing a liquid precursor material disposed within a container, immersing at least one substrate into the liquid precursor material, curing portions of the liquid precursor material in a focal point defined by a lens of an electromagnetic radiation while the at least one substrate is disposed in the precursor material, wherein a wavelength of the radiation is about double a wavelength required to cure the liquid precursor material, moving the focal point of the radiation within the precursor material to form at least one cutting edge structure on the substrate based on the model, and removing the substrate with the at least one cutting edge structure from the liquid precursor material in the container.

In one aspect, the substrate includes a blade body or blade support for the at least one cutting edge structure. In another aspect, an extended cutting edge is formed of closely spaced cutting edge elements.

The step of moving the focal point further includes movement of the lens in any direction, or movement of the container in any direction, or any combination thereof. The at least one cutting edge structure is formed of a plurality of voxels. The precursor material is comprised of a monomer material, an oligomer material, or any combination thereof. The at least one cutting edge structure may include a gothic arch, a roman arch, or one or more undercuts. A tip radius of the at least one cutting edge structure is less than 1 micrometer. The precursor material is comprised of an acrylic based material.

In another aspect, at least one of the precursor material or the cured polymeric material is transparent to electro-magnetic radiation at a wavelength in the range of 250 to 1500 nanometers.

The removing step further includes physical or chemical removal of the substrate from the cured polymeric material cutting edge structure.

A photo-initiator of about 1 to about 3% by weight of composition is added to the second precursor material prior to the curing step. The step of curing includes cross-linking or polymerization.

In another embodiment, the at least one cutting edge structure is a razor blade or a portion of a blade box. The invention further includes the step of assembling the razor blade or the blade box into a razor cartridge housing or frame.

In another aspect, the razor blade of the present invention includes a cutting edge structure comprised of a polymeric material, the polymeric material produced on a substrate disposed in a liquid precursor material for the polymeric material, portions of the liquid precursor material cured in a focal point defined by a lens of an electromagnetic radiation wherein a wavelength of the radiation is about double a wavelength required to cure the liquid precursor material. In another aspect, at least one of the precursor material or the cured polymeric material is transparent to electro-magnetic radiation at a wavelength in the range of 250 to 1500 nanometers. Further, the substrate comprises a blade body or blade support. Further still, the cutting edge structure comprises an extended cutting edge formed of closely spaced cutting edge elements.

In another embodiment, a blade box includes at least one cutting edge structure, at least one non-cutting edge structure coupled to the at least one cutting edge structure, and both the cutting and non-cutting edge structures comprised of a polymeric material, the polymeric material produced by a liquid precursor material for the polymeric material wherein portions of the liquid precursor material are cured in a focal point defined by a lens of an electromagnetic radiation wherein a wavelength of the radiation is about double a wavelength required to cure the liquid precursor material.

The details of one or more embodiments of the invention are set forth in the accompanying drawings and the description below. Other features, objects, and advantages of the invention will be apparent from the description and drawings, and from the claims.

DETAILED DESCRIPTION OF THE DRAWINGS

DETAILED DESCRIPTION OF THE INVENTION

The methods of the present disclosure provide for the manufacture of cutting edge structures (e.g., razor blades, which may be used in shaving devices or razors). Specifically, disclosed are methods for manufacturing cutting edges or razor blades for shaving devices from polymeric material.

As used herein, a polymeric material signifies a material that is formed of a polymer, the latter being a large, chain-like molecule made up of monomers, which are small molecules. Generally, a polymer can be naturally occurring or synthetic. In the present invention, preferred embodiments comprise synthetic or semi-synthetic polymers. The synthetic or semi-synthetic polymer materials generally can occur in two forms or states. The first state may be a soft or fluid state and the second state may be a hard or solid state. Generally synthetic polymers are molded or extruded when in the first state (e.g., liquid or soft) and subsequently formed into an object that is in a second state (e.g., hard or solid). In some instances, the material is reversible (e.g., a material in the second state can be converted back to its first state) while in others, the polymerization is irreversible (e.g., the material cannot be converted back to its first state).

A thermoplastic polymer is a type of reversible polymer that is in a soft or liquid first state at elevated temperatures (e.g. 200° C. and above) and converts to a solid second state when cooled to ambient temperatures. Thermoplastic polymers are typically used for injection molding or extrusion techniques of the prior art.

For those polymeric materials where the second state is obtained from the first state via irreversible polymerization, the first state of the polymeric material may generally be thought of as being a "precursor" for the second state of the polymeric material. As such, in the present invention, a polymeric material may be generated from a precursor material or a material in a first state.

The materials that are generally desired for the present invention cutting edge structures are materials in the first, soft or liquid, states which comprise monomers or short chain length (e.g., low molecular weight) polymers known as oligomers or both. Both monomers and oligomers are referred to herein as "precursors." These precursors are converted into long chain length polymeric material in the second, solid state through a polymerization or cross-linking process, herein referred to as a curing process. Curing the precursor material can generally be achieved under the influence of heat, light, ionic or high energy radiation, or any combination thereof. After curing, the solid polymeric material is achieved.

Figure 1:
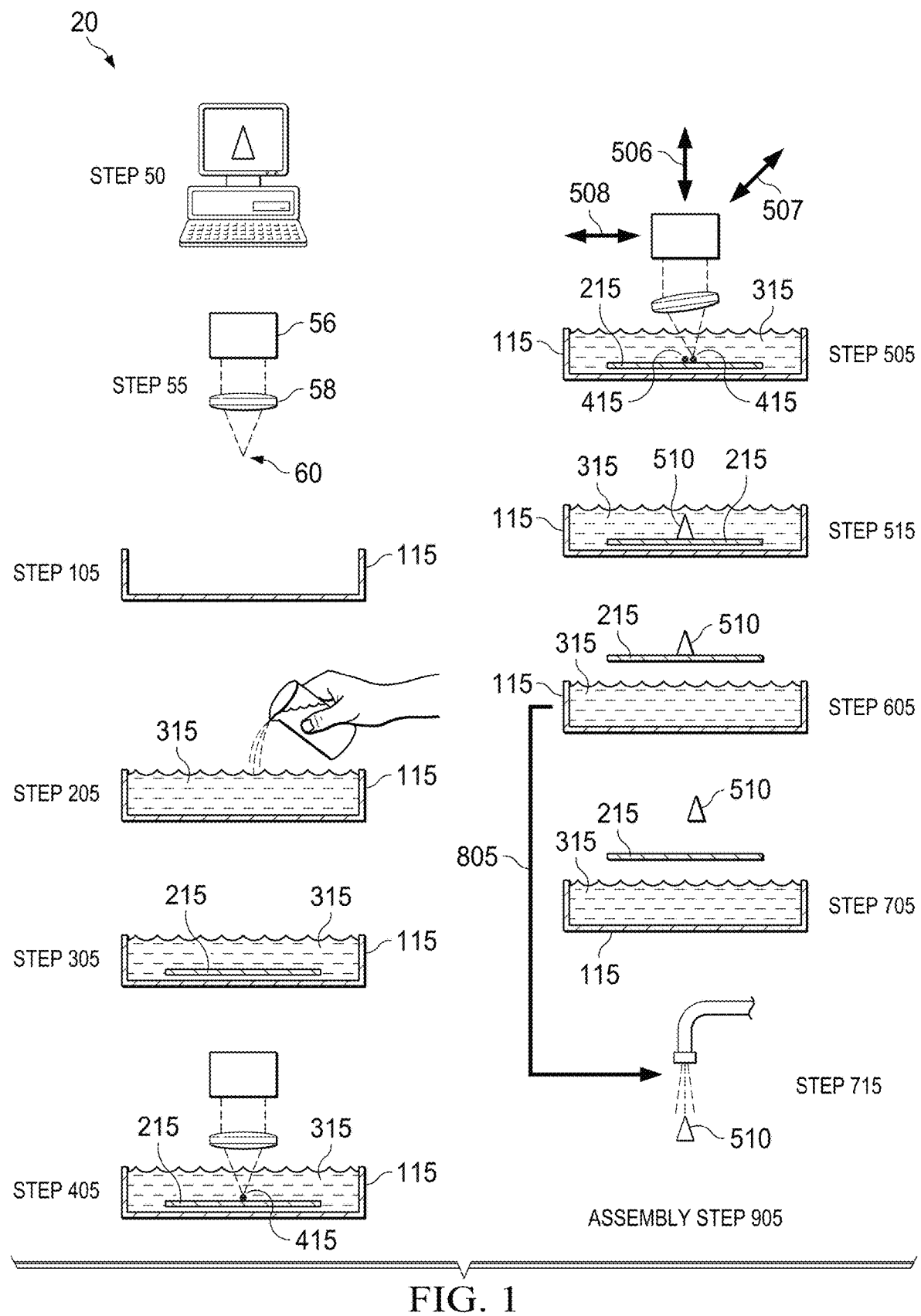
FIG. 1 is a flow diagram of a first method of manufacturing razor blades from polymer, according to a preferred embodiment of the present invention.

In FIG. 1, a flow diagram 20 of a method of manufacturing razor blades from a polymeric material according to a preferred embodiment of the present invention is illustrated.

At step 50, a computer model of a 3-dimensional physical object is provided. The 3-dimensional object of the present invention is desirably a razor blade though it may be a razor cartridge housing or other components of the razor such as the guard, or the cap or lubrication elements, or any combination of components thereof.

At step 55, electromagnetic radiation from a source 56 can be focused by a lens system 58 into a focal point 60 with dimensions less than 10 micro-meters, more preferably with dimensions down to about half of the radiation wavelength, (e.g., about 0.12 micro-meters to about 0.50 micro-meters).

At step 105 a reservoir or container 115 is provided. The reservoir or container may be of any type, shape or size but is preferably selected to offer sufficient space in which to form cutting edge structures such as razor blades.

A liquid precursor material 315 is preferably selected to fill the reservoir or container 115 as shown in step 205. There is generally no limitation to the types of the precursor material that can be used though it is desirable that a fluid precursor material is used and that the material can be converted (e.g., cured) from the fluid state to a solid polymeric state by exposure to electro-magnetic radiation. In this regard, the fluid has to be transparent for electromagnetic radiation. Desirably the filling or pouring step 205 of the present invention occurs at ambient temperature ranging from about 10 degrees Celsius to about 40 degrees Celsius or may be heated up to 100 degrees Celsius to reduce its viscosity.

At step 305, a solid physical substrate 215 is immersed into the liquid precursor material 315 in the reservoir 115. The substrate may have a smooth surface and may preferably be planar. The substrate may be comprised of glass, silicon, sapphire, diamond, ceramic steel or another polymeric material in the present invention. Roughness values of the substrate ranging from about 100 nano-meters to about 1 nano-meter are contemplated in the present invention.

Figure 2:
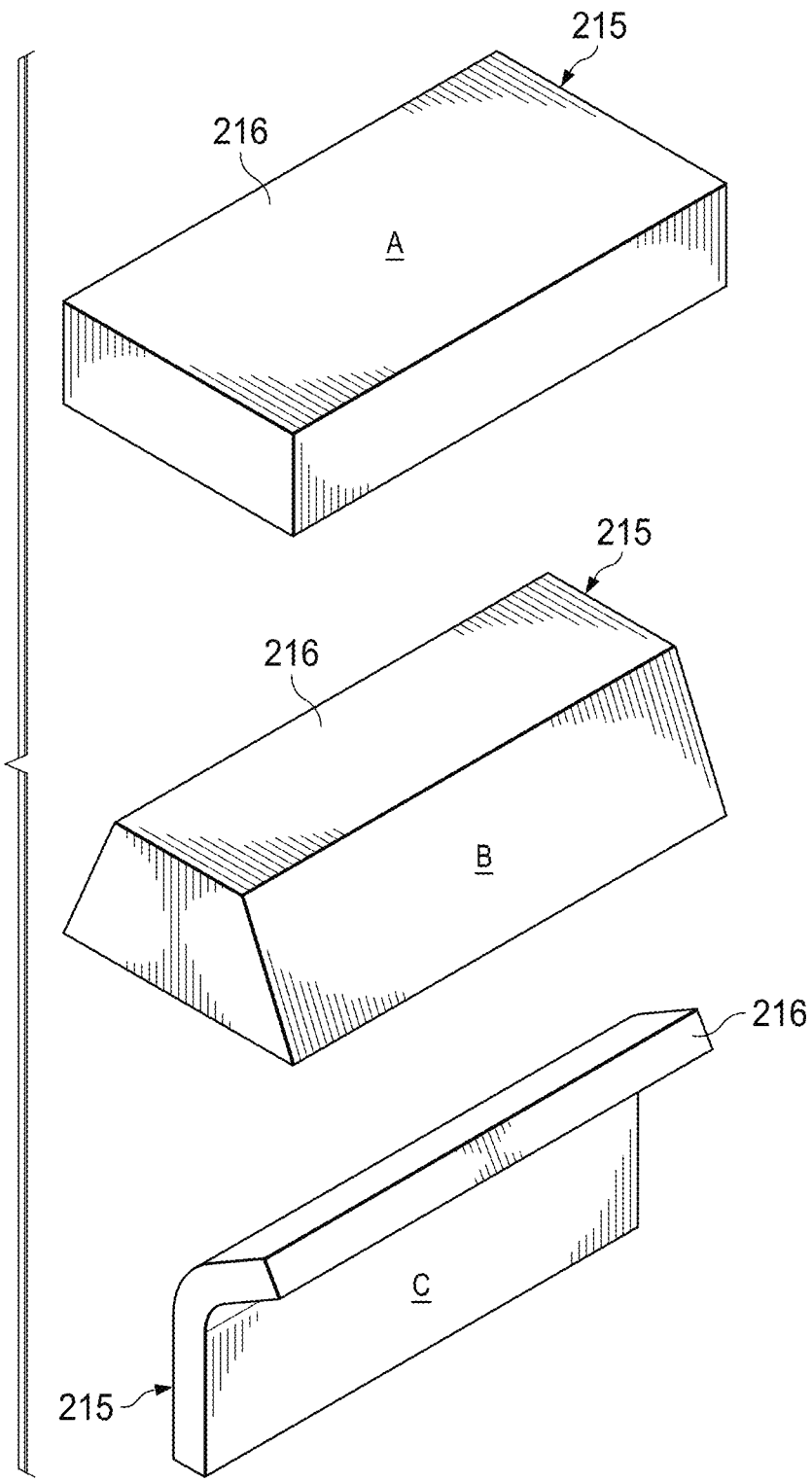
FIG. 2 is a diagram of various example substrates capable of being used for the process of FIG. 1 according to the present invention.

The substrate 215, regardless of material composition, may have any shape or profile feasible for forming cutting edges for razor blades. It may be a flat or extended substrate, on which entire razor blades are fabricated, or it may consist of a base merely for the edge such as a blade body or a blade support. Various types of substrates 215 that can be used for the process of FIG. 1 are shown in FIG. 2. For example, a planar or flat substrate, the type A shown, is contemplated in the present invention as is a blade body, the type B, or a blade support substrate, the type C, also shown. Each of these substrates has a surface 216 onto which the polymeric cutting edge structure will be formed in step 405.

After the substrate 215 is immersed into the liquid precursor material at step 305, the precursor material 315 in the liquid first state is cured such that it becomes a polymeric material in the second solid state. This is accomplished at step 405 by directing the focal point 60 of the electromagnetic radiation into the liquid precursor material 315 contained in the reservoir 115 to convert the transparent liquid precursor material 315 into a solid polymeric material in the volume element (hereinafter referred to as "voxel") 415 illuminated by the focused radiation. The drawing at step 405 of FIG. 1 depicts the resultant voxel utilizing the 2PP process described below. Further at step 405, the first voxel of the desired object will be produced in the liquid precursor 315 adjacent to the substrate 215, so that the completed object is anchored to the substrate surface 216.

For high resolution additive manufacturing, such as 2PP, the electromagnetic radiation desirably has about double the wavelength required to cure the precursor material (e.g., required to activate a photo-initiator when used as described below), in order to cure the fluid polymeric precursor material. This wavelength generally ranges from about 250 nano-meters to about 1500 nano-meters, preferably between 400 nano-meters and 1300 nano-meters. The source of electromagnetic radiation 56 emits power sufficient to create a finite probability that two photons can be absorbed simultaneously by the fluid polymeric precursor material 315 in the focal point 60 to produce a solid polymeric voxel 415. Desirably, the electromagnetic radiation is emitted in very short (e.g., femtosecond) pulses in order to reduce required average power of the source 56 to a feasible level (e.g., 100 milli-Watts).

At step 505, the focal point 60 of the electromagnetic radiation can be disposed over different voxels 415 to fabricate the object 510, preferably by moving or scanning focal point 60 within or through the liquid precursor 315 in the reservoir 115 by moving the lens 58 in any direction, while keeping the source 56 centered on the lens 58. Arrows 506, 507, 508 depict three possible directions of movement of the lens 58 though the directions of movement may be angled or rotated in any manner. Alternately, the reservoir 115 may be moved according to the computer model 50 in any direction. In addition, a combination of both lens and reservoir movements in different directions may be utilized in the present invention To accelerate the fabrication of object 510 in step 505, multiple radiation sources 56 and/or lenses 58 (not shown) may be utilized in parallel to create multiple voxels 415 simultaneously.

In either scenario, a multitude of solid polymeric material voxels 415 are produced that combined together represent the three-dimensional physical object 510 or objects desired (e.g., one or more razor blades) in step 515. The cutting edge structure 510 represents the structure in the shape of a final cutting edge or razor blade edge.

After step 515 of FIG. 1, the solid polymeric structure 510 can be removed from the reservoir. At step 605 in FIG. 1, the solid polymeric structure 510 that was formed, along with the substrate 215, are desirably removed together from the reservoir 115. For instance, if the substrate 215 serves as a blade support for the edge structure 510 this may be the last step prior to cleaning step 715 and assembly step 905 of the cutting edge structures in a hair removal device as indicated by the arrow 805. As shown at step 705 of FIG. 1, the solid polymeric structure 510 can also be physically or chemically removed from the substrate (e.g., if the substrate is not a blade body of type B or a blade support of type C or otherwise necessary), revealing a completed three-dimensional object 510 for assembly in step 905. Acrylic based solid polymeric structures may be removed from the substrate using e.g. propylene glycol monomethyl ether acetate (PGMEA) and n-methyl-2-pyrrolidone (NMP) based solvents.

Prior to assembly step 905, as shown in step 715 of FIG. 1, it may be necessary or beneficial to remove or wash out any excess of uncured material or other remains from the surface or any cavities formed of the three-dimensional solid polymeric object 510 (e.g., a fabricated cutting edge structure or blade). Suitable wash agents or solvents include 1-propanol or isopropanol.

Figure 3:
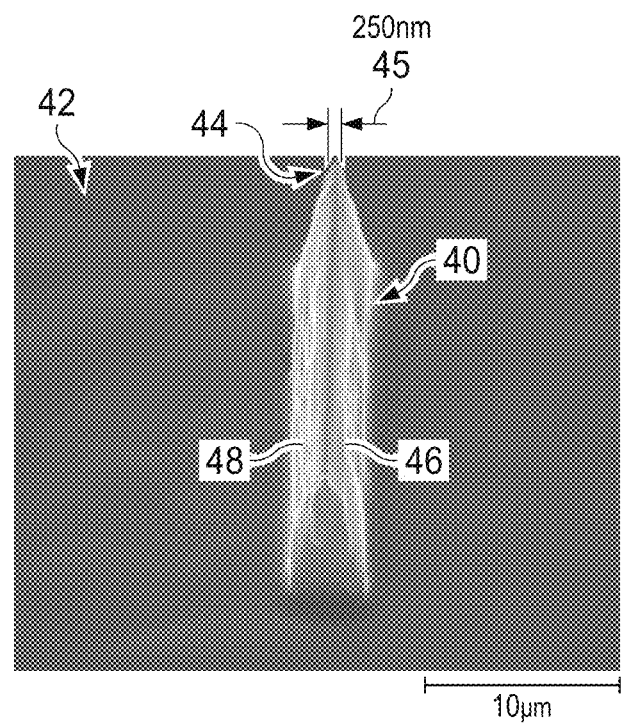
FIG. 3 is a close-up micrograph view of the razor blade cutting edge formed using the process of FIG. 1.

Utilizing the process of the present invention, based on the 2-photon polymerization process (2PP), which produces structures by scanning the focal point of a high intensity electromagnetic radiation in 3 dimensions within or through a bath of photo-curable precursor according to a CAD specification to fabricate an object 510 with sub-micrometer sized features, a polymeric object 510 formed from sub-micrometer sized voxels with a tip radius 45 of about 250 nm has been demonstrated as can be seen in FIG. 3 disposed on a substrate 42. The fabricated object 510 is a cutting edge structure 40 which has a blade tip 44 and two facets 46 and 48 that diverge from the tip 44. Thus, as shown in FIG. 3, the solid polymeric structure 40 produced by the process of FIG. 1 has the shape and profile of a razor blade with desired tip radius (e.g., less than 1 μm).

Figure 4:
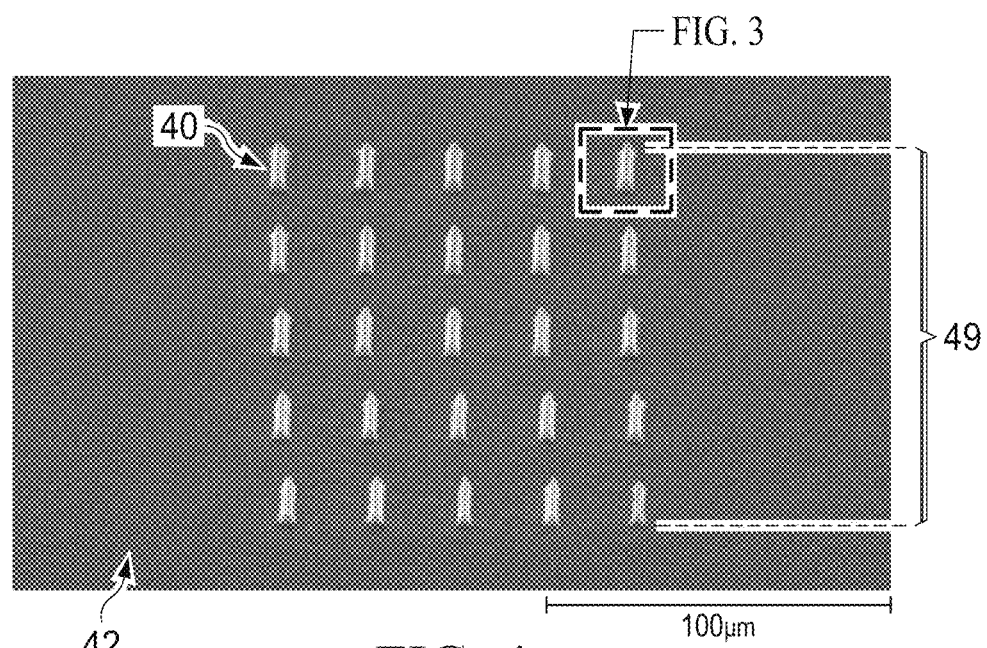
FIG. 4 is a top micrograph view of an array of cutting edge structures of the present invention.

An array 49 of solid polymeric cutting edge structures 40 can be produced by the process of FIG. 1 as shown in the micrograph of FIG. 4 which depicts a view from the top of the blade edge elements 40 arranged in a 5×5 array 49 and residing on a glass substrate 42.

In the present invention, the polymeric material is preferably an acrylic based material, more preferably a polymer with monomer or oligomer formulations such as Femtobond 4B, supplied by Laser Zentrum Hannover e.V., Germany, or E-SHELL® 300 supplied by EnvisionTEC GmbH, Germany, and most preferably polymeric materials from the ORMOCER® family, such as ORMOCORE, supplied by Microresist Technology GmbH.

A photo-initiator of about 1 to about 3% by weight of composition may be added to the second polymeric material prior to the curing step 405 in FIG. 1. Photo-initiators generally start the polymerization or cross-linking (e.g., curing) process of the precursor of a polymeric material by absorbing radiation of a specific wavelength, commonly visible or UV light, and creating radicals that react with the monomers or oligomers and link them together. A photo-initiator commonly used with acrylate based precursors is alpha hydroxy ketone, sold under the trade name of Irgacure 184 by BASF. In the case of ORMOCORE, a photo-initiator may be IRGACURE®369 also by BASF.

If a photo-initiator is used, the polymeric material is transparent at a specific wavelength in this range, optimally chosen for the used photo-initiator. Hence, the precursor and the cured solid polymer of the present invention generally need to be at least partially transparent for the wavelength of the electromagnetic radiation to be effective. The transparency selection of the polymer is necessary for effectiveness as curing or polymerization of the whole object (e.g., cutting edge structure) generally cannot occur when using light if the light cannot penetrate below the surface of the polymer.

Alternatively, materials including any photo-curable polymer known in 3D-printing, stereo-lithography, medical applications (e.g., dentistry) or bonding can be used as long as curing (e.g., polymerization or cross-linking or both of the monomeric or the oligomeric precursor) can be achieved by exposing the precursor to electromagnetic radiation. Hence, desirably, the precursor and the cured polymer generally shall be transparent for the desired frequency of the electromagnetic radiation.

Figure 5:
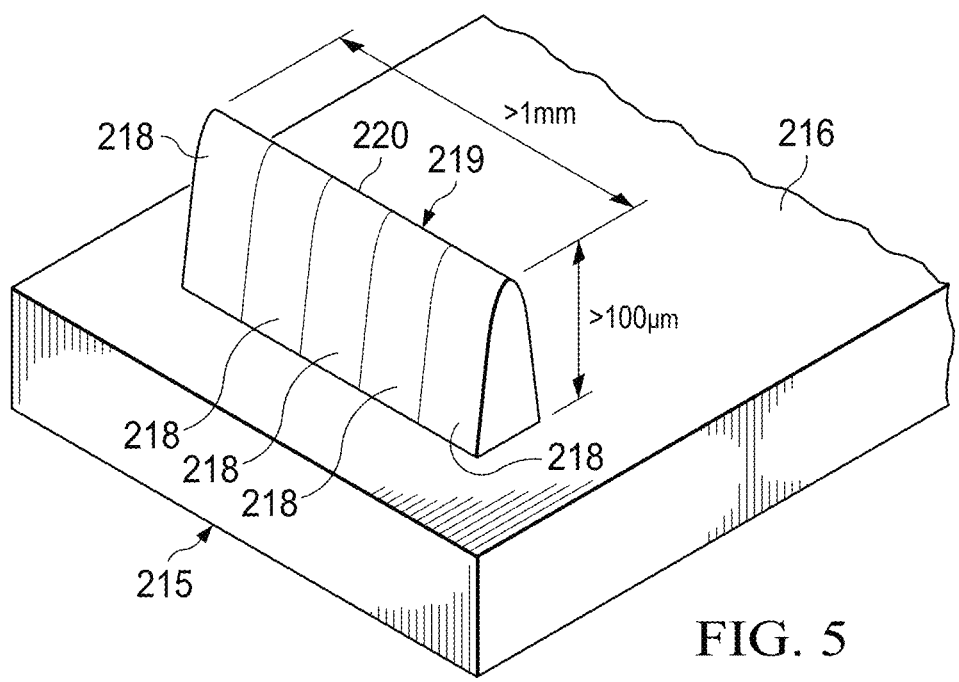
FIG. 5 is a diagram of an extended polymer cutting edge structure.

Shrinkage occurring during curing leads to internal stresses, which build up over extended dimensions and may cause fracture of the extended polymer objects when in use. It has been demonstrated that this disadvantage can be overcome by producing a series of narrow (e.g., less than 1 mm wide) closely spaced cutting edge elements 218 adjacent to each other that are joined to form an extended cutting edge structure 219 with an extended cutting edge 220 as shown in FIG. 5. The separate closely spaced cutting edge elements 218 and a portion of the extended cutting edge structure 219 and extended edge 220 are visible in the micrograph of FIG. 6A. The micrograph in FIG. 6B shows the entire extended cutting edge structure 219 with lateral dimensions of about 1.2 mm long, about 0.45 mm high and about 4 μm wide.

The dimensions of the cutting edge structures are in the range of centimeters. When fabricating the entire cutting structure solely by a high resolution additive manufacturing process such as 2PP, the overall blade size may be limited to millimeters length because to achieve sub-micro meter resolution, the scanning steps have to be small which in turn requires a long time to fabricate large-scale (e.g., on the order of centimeter) objects. Theoretically this can be overcome by first creating a larger blade body or blade support using conventional stereo lithography (e.g., 1-photon polymerization) at low resolution and high scanning speed onto which the cutting edge is added at sub-micrometer resolution using the 2PP process. Alternatively, the fabrication process may be accelerated by using a blade body of type B or a blade support of type C, as shown in FIG. 2.

The tip radius of the cutting edge structure produced by the present invention process is desirably in the range of less than about 1 micrometer. The hardness of a polymeric cutting edge structure formed, such as with ORMOCER®, may reach near 100 MPa after curing.

Figure 6A:
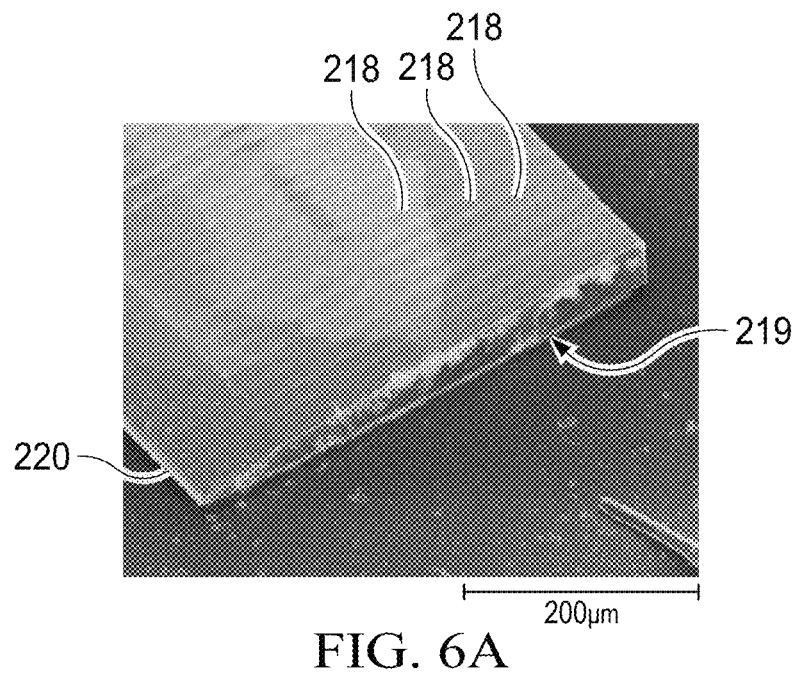
FIGS. 6A and 6B are a micrograph view of the extended cutting edge shown in FIG. 5 formed using the process of FIG. 1.
Figure 6B:
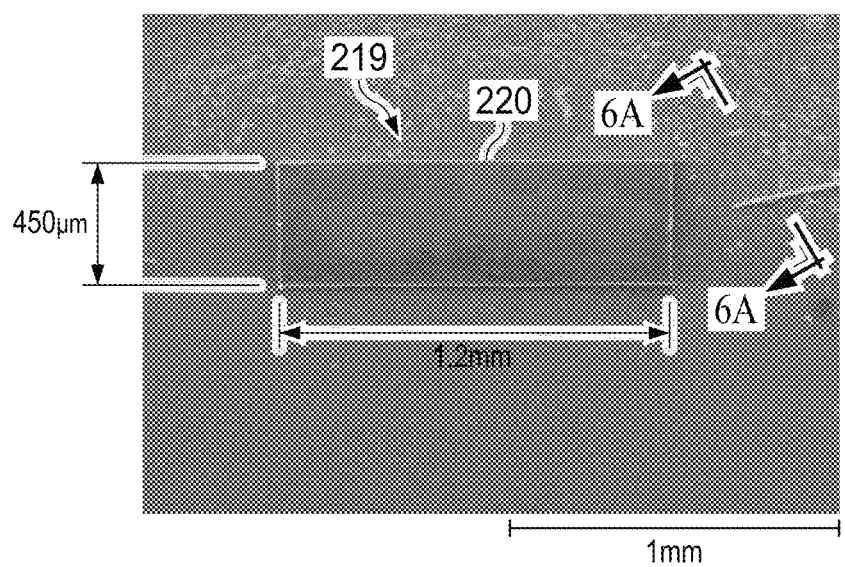
Figure 10:
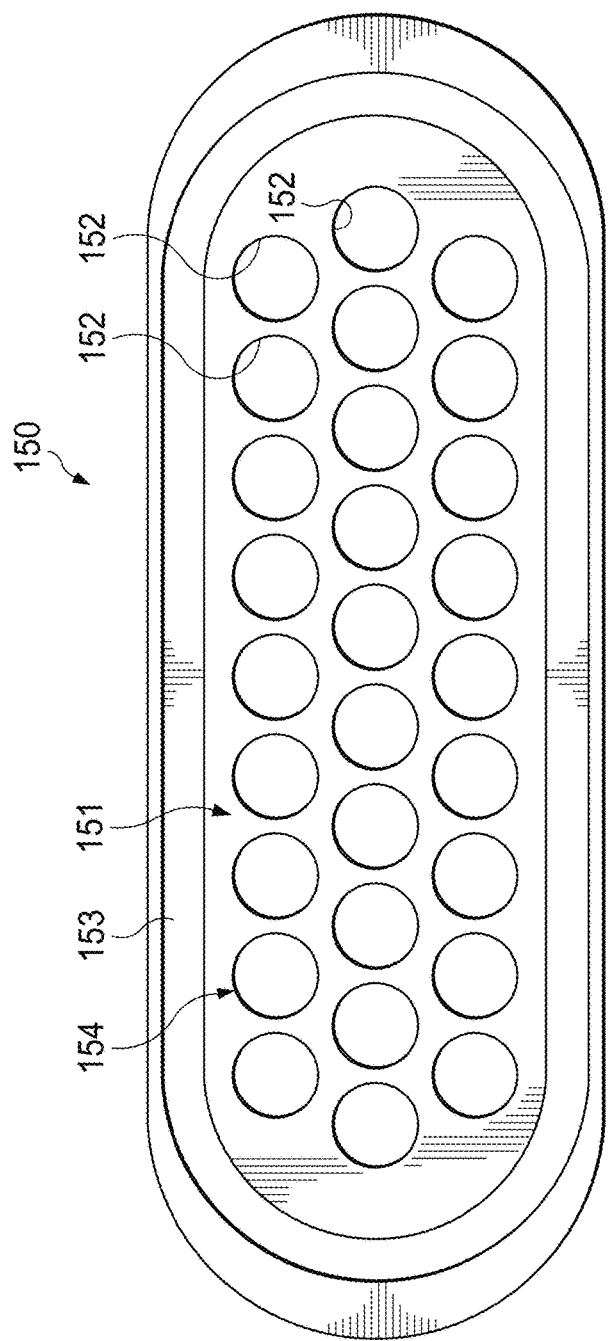
FIG. 10 is a perspective view of a structure having a plurality of non-linear cutting edges formed therein according to a still further embodiment of the present invention.

While a conventional razor blade wedge profile is similar to the type shown in FIGS. 3 and 6A, the present invention contemplates cutting edge structures with any number of facets, e.g., more than 2 or 3, and these facets need not be planar. Several exemplary shapes of the present invention are shown below in FIGS. 10 and 11 though any desirable, feasible shape is contemplated in the present invention.

It may or may not be necessary to remove the cutting edge structure from the substrate. In either case, each cutting edge structure that is produced can be generally assembled individually into a razor cartridge. For example, if a cutting edge structure does not include a blade support type substrate, one or more polymer razor blades may be adhered to blade supports (e.g., with glue, ultrasonic welding) and assembled into razor cartridge housings. Furthermore, the cutting edge structure blades can be processed or coated if necessary prior to assembly into a razor cartridge at step 905 of FIG. 1.

Figure 7:
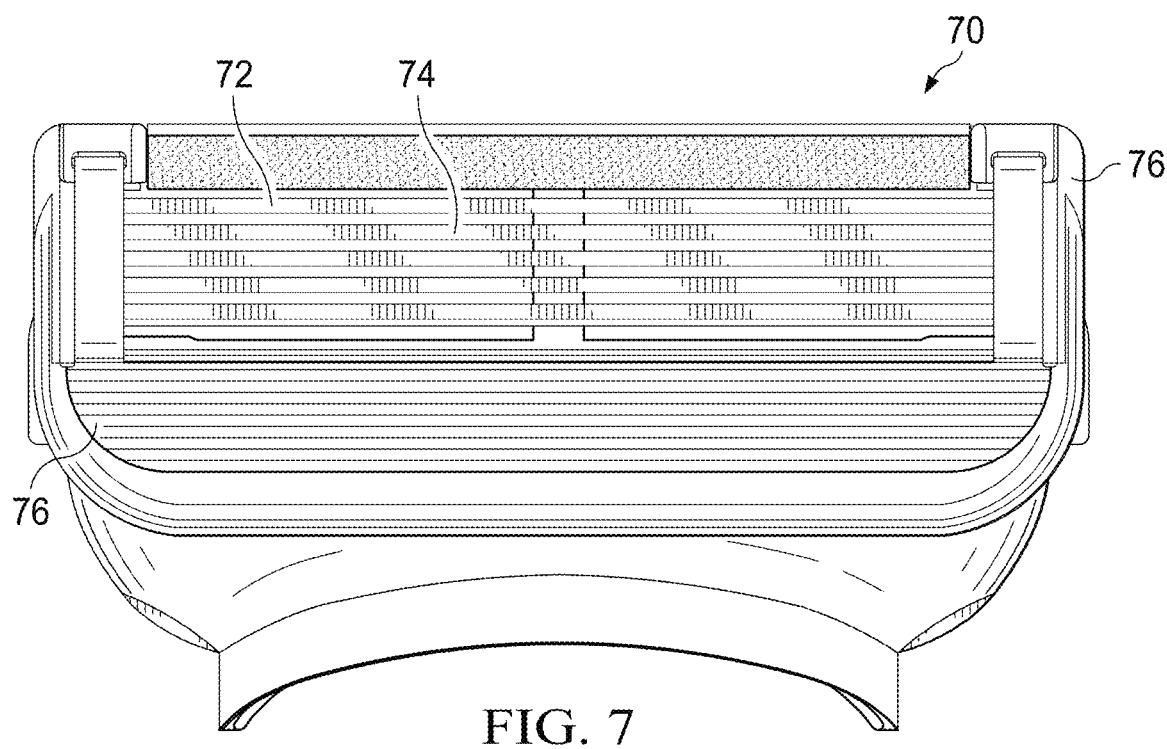
FIG. 7 is a front view of a razor cartridge having polymer razor blades made with the process of FIG. 2, according to one embodiment of the present invention.

A razor cartridge 70 having one or more cutting edge structures or razor blades 72 made of polymer 74 of the present invention can be assembled as shown in FIG. 7. Razor cartridge 70 is similar to razor cartridges that are commercially available utilizing steel blades which are cutting elements and with non-cutting edge structures such as the plastic elements housing and frame components 76. In assembly step 905, the polymeric razor blades 72 can be secured to a mounting assembly prior to being inserted into the frame 76 or housing or they may be mounted directly on the frame.

While the methods of manufacturing described herein have been referred to with primary reference to a single cutting edge structure (e.g., razor blade), the methods are easily applicable to the manufacture of multiple cutting edge structures simultaneously.

Figure 8:
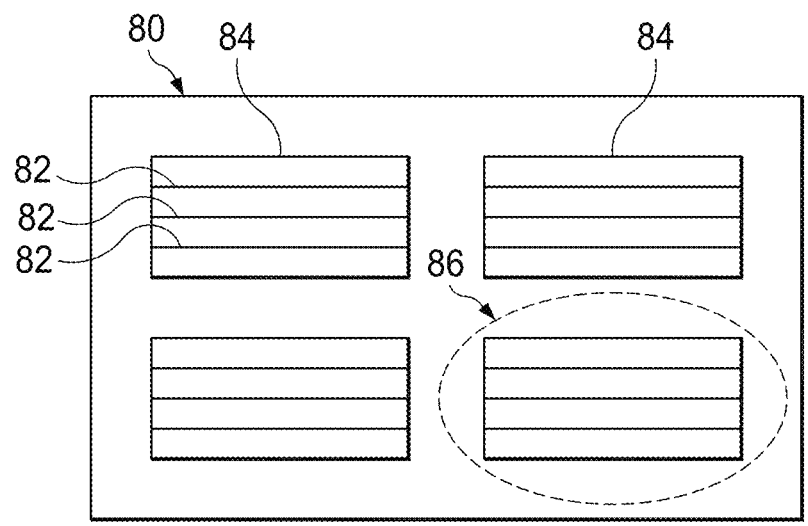
FIG. 8 is a top view of a plurality of blade boxes in a base structure, each having a plurality of blades and a frame in another embodiment of the present invention.
Figure 9:
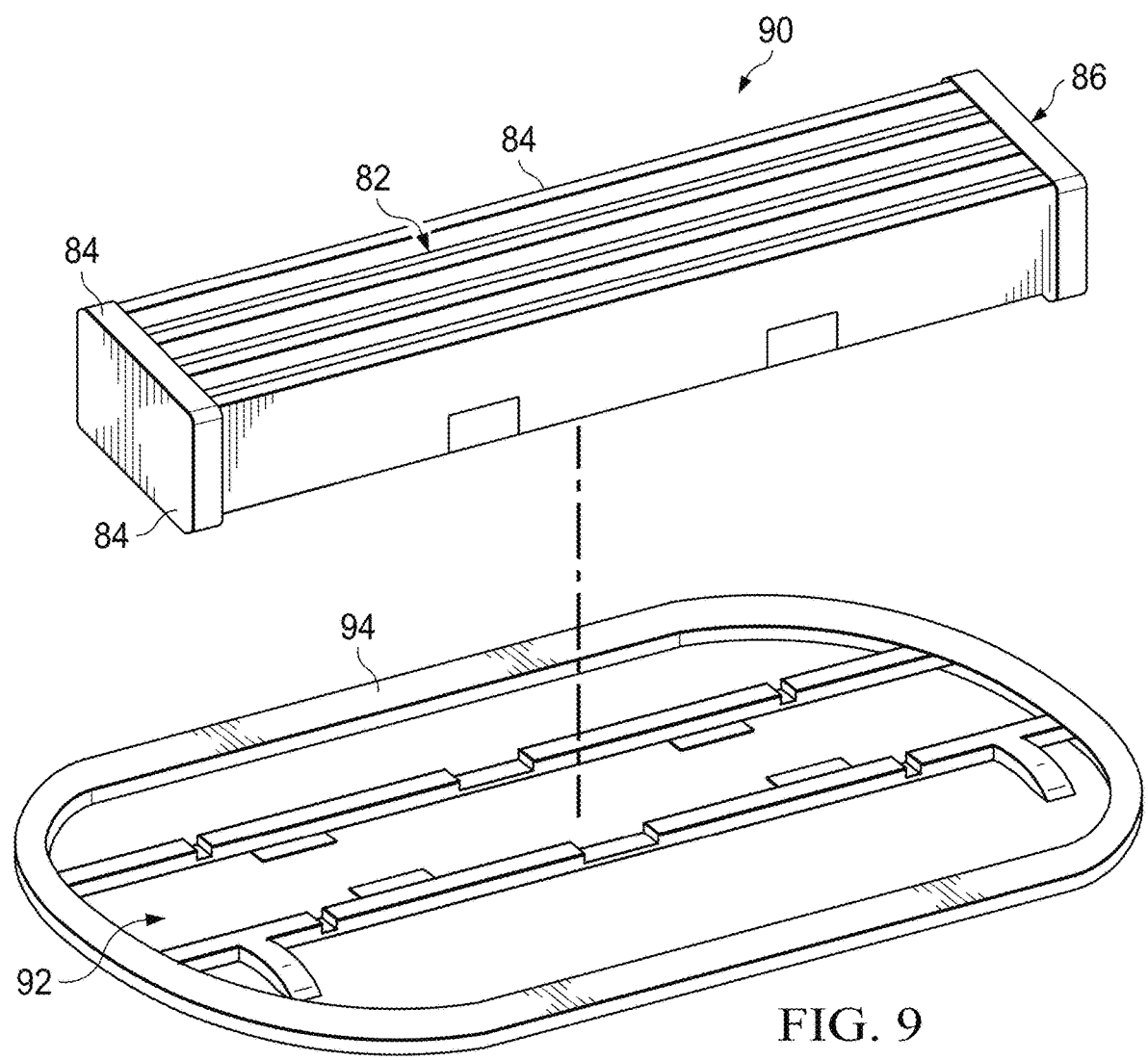
FIG. 9 is a top view of an entire razor cartridge of the present invention.

Turning to FIG. 8, a plurality of razor blades 82 may be formed clustered together in groups of three blades with a small frame 84. The frame in FIG. 8 is a non-cutting edge structure while the razor blades in FIG. 8 are cutting edge structures. The clusters have a generally rectangular shape and for ease in discussion are referred to herein as blade boxes 86. The plurality of razor blades 82 can be manufactured in this clustered organization to reduce downstream process steps in the shaving razor system assembly. The blade boxes 86 have 3 individual razor blades 82, as illustrated, enclosed by a frame 84. The blade boxes 86 can be manufactured identically or they can be different, such as each box having differences in blade spacing, included blade angles, number of blades, orientation of the blades, and the like. The differences can be made via changes to the computer model of the cutting edge structures. A blade box 86 can be removed from the base structure in the same manner as described above, but such that the self-contained blade box 86 is a singular unitary part. In FIG. 9, a blade box 86 is inserted into an opening 92 in the housing 94 of a razor cartridge 90 and secured therein or be formed into a razor cartridge entirely at the outset (not shown).

Assembling the razor cartridge in such a manner eliminates the somewhat time consuming or difficult steps of affixing each individual razor blade to a blade support or to a housing, inserting each blade support-razor blade pair or each blade in the razor cartridge housing, and aligning each separate razor blade to the desired blade height, angle, and spacing. By utilizing the method described herein, the plurality of razor blades are aligned and secured in the blade box, thereby eliminating the need to affix individual blade supports and the difficult process of aligning 3 or more separate razor blades into the razor cartridge housing. While FIG. 8 illustrates blade boxes 86 having 3 razor blades, it is to be understood that any number of razor blades can be clustered together, such as 2, 4, 5, or more.

While the blades illustrated in the figures thus far have generally linear blade edges, other blade shapes and edge patterns can be produced by the methods described herein.

To that end, in a still further alternative embodiment, different cutting structures in addition to straight edged or wedge-shaped configuration for blade edges are also contemplated in the present invention.

These other shapes are produced by using a process of FIG. 1 that comprises a different computer model of the 3-dimensional object. In some instances, a sheet of material 151 may be the 3-dimensional object with openings 154 that contain internal cutting edges 152 that are non-linear is produced by the process in FIG. 1 using a substrate frame 153, as shown for instance in the blade box 150 of FIG. 10.

Figure 11:
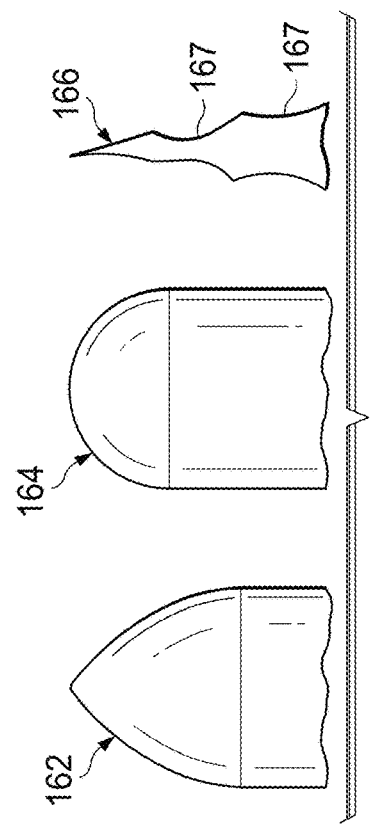
FIG. 11 depicts various shapes of present invention cutting edge structures.

Any number of shapes or profiles for the cutting edge template, and hence, for the cutting edge structure or structures that will be formed, is contemplated in the present invention. The present invention includes, but is not limited to, the additional illustrative embodiments depicted in FIG. 11. Two arched cutting edge profiles, e.g., a gothic arch profile 162, a roman arch profile 164 are shown in FIG. 11 though any other feasible shape of the cutting edge structure is encompassed by the present invention (e.g., wavy, serrations, saw teeth, etc.). Additionally, a cutting edge profile 166 having one or more undercuts 167 is also shown in FIG. 11.

Accordingly, other embodiments are within the scope of the following claims.

EXAMPLES/COMBINATIONS

A. A method for manufacturing at least one cutting edge structure comprising the steps of:
  providing a computer model of a cutting edge structure;
  providing a liquid precursor material disposed within a container;
  immersing at least one substrate into said liquid precursor material;
  curing portions of said liquid precursor material in a focal point of an electromagnetic radiation while said at least one substrate is disposed in said precursor material;
  wherein a wavelength of said radiation is about double a wavelength required to cure said liquid precursor material;
  moving the focal point of said radiation within said precursor material to form at least one cutting edge structure on said substrate based on said model; and
  removing said substrate with said at least one cutting edge structure from said liquid precursor material in said container.

B. The method of paragraph A, wherein the substrate comprises a blade body or blade support for said at least one cutting edge structure.

C. The method of paragraphs A or B, wherein an extended cutting edge is formed of closely spaced cutting edge elements.

D. The method of paragraphs A, B, or C, wherein said moving the focal point step further includes movement of said lens in any direction, or movement of the container in any direction, or any combination thereof.

E. The method of any of the preceding paragraphs, wherein said at least one cutting edge structure is comprised of a plurality of voxels.

F. The method of any of the preceding paragraphs, wherein said precursor material is comprised of a monomer material, an oligomer material, or any combination thereof.

G. The method of any of the preceding paragraphs, wherein said at least one cutting edge structure comprises a gothic arch, a roman arch, or one or more undercuts.

H. The method of any of the preceding paragraphs, wherein a tip radius of said at least one cutting edge structure is less than 1 micrometer.

I. The method of any of the preceding paragraphs, wherein said precursor material is comprised of an acrylic based material.

J. The method of any of the preceding paragraphs, wherein at least one of said precursor material or said cured polymeric material is transparent to electro-magnetic radiation at a wavelength in the range of 250 to 1500 nanometers.

K. The method of any of the preceding paragraphs, wherein the removing step further comprises physical or chemical removal of the substrate from said cured polymeric material cutting edge structure.

L. The method of any of the preceding paragraphs, wherein a photo-initiator of about 1 to about 3% by weight of composition is added to the second precursor material prior to the curing step.

M. The method of any of the preceding paragraphs wherein said step of curing comprises cross-linking or polymerization.

N. The method of any of the preceding paragraphs, wherein said at least one cutting edge structure is a razor blade or a portion of a blade box.

O. The method of paragraph N, further comprising the step of assembling said razor blade or said blade box into a razor cartridge housing or frame.

P. A cutting edge structure comprised of a polymeric material, said polymeric material produced on a substrate disposed in a liquid precursor material for said polymeric material, portions of said liquid precursor material cured in a focal point of electromagnetic radiation wherein a wavelength of said radiation is about double a wavelength required to cure said liquid precursor material.

Q. A cutting edge structure of paragraph P, whereby the substrate comprises a blade body or blade support.

R. A cutting edge structure of paragraphs P or Q, wherein said cutting edge structure comprises an extended cutting edge formed of closely spaced cutting edge elements.

S. The cutting edge structure of paragraphs P, Q, or R, wherein said precursor material is comprised of a monomer material, an oligomer material, or any combination thereof.

T. The cutting edge structure of paragraphs P, Q, R, or S, wherein said at least one cutting edge structure comprises a gothic arch, a roman arch, or one or more undercuts.

U. The cutting edge structure of any of the preceding paragraphs, wherein a tip radius of said at least one cutting edge structure is less than 1 micrometer.

V. The cutting edge structure of any of the preceding paragraphs, wherein at least one of said precursor material or said cured polymeric material is transparent to electro-magnetic radiation at a wavelength in the range of 250 to 1500 nanometers.

W. The cutting edge structure of any of the preceding paragraphs wherein said precursor material is cured by cross-linking or polymerization.

X. The cutting edge structure of any of the preceding paragraphs is a razor blade.

Y. A blade box comprising:
at least one cutting edge structure;
at least one non-cutting edge structure coupled to said at least one cutting edge structure, both said cutting and non-cutting edge structures comprised of polymeric material, said polymeric material produced on a substrate disposed in a liquid precursor material for said polymeric material, portions of said liquid precursor material cured in a focal point of electromagnetic radiation wherein a wavelength of said radiation is about double a wavelength required to cure said liquid precursor material.

Z. The blade box of paragraph Y, wherein said precursor material is comprised of an acrylic based material.

AA. The blade box of paragraphs Y or Z, wherein said electromagnetic radiation cures said precursor material in a plurality of voxels by moving a focal point in any direction.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cutting edge structure comprised of a polymeric material, said polymeric material produced on a substrate disposed in a liquid precursor material for said polymeric material, portions of said liquid precursor material cured in a focal point of electromagnetic radiation wherein a wavelength of said radiation is about double a wavelength required to cure said liquid precursor material, wherein said cutting edge structure comprises a plurality of cutting edge elements extending linearly to form an extended cutting edge, and wherein a tip radius of said at least one cutting edge structure is less than 1 micrometer.

2. A cutting edge structure of claim 1, whereby the substrate comprises a blade body or blade support.

3. The cutting edge structure of claim 2, wherein said precursor material is comprised of a monomer material, an oligomer material, or any combination thereof.

4. The cutting edge structure of claim 1, wherein said at least one cutting edge structure comprises a gothic arch, a roman arch, or one or more undercuts.

5. The cutting edge structure of claim 1, wherein a tip radius of said at least one cutting edge structure is 250 nm.

6. The cutting edge structure of claim 1, wherein at least one of said precursor material or said cured polymeric material is transparent to electro-magnetic radiation at a wavelength in the range of 250 to 1500 nanometers.

7. The cutting edge structure of claim 1, wherein said precursor material is cured by cross-linking or polymerization.

8. The cutting edge structure of claim 1 is a razor blade.

9. A blade box comprising:
at least one cutting edge structure;
at least one non-cutting edge structure coupled to said at least one cutting edge structure, both said cutting and non-cutting edge structures comprised of polymeric material, said polymeric material produced on a substrate disposed in a liquid precursor material for said polymeric material, portions of said liquid precursor material cured in a focal point of electromagnetic radiation wherein a wavelength of said radiation is about double a wavelength required to cure said liquid precursor material, wherein said cutting edge structure comprises a plurality of cutting edge elements extending linearly to form an extended cutting edge, and wherein a tip radius of said at least one cutting edge structure is less than 1 micrometer.

10. The blade box of claim 9, wherein said precursor material is comprised of an acrylic based material.

11. The blade box of claim 9, wherein said electromagnetic radiation cures said precursor material in a plurality of voxels by moving a focal point in any direction.

12. A cutting edge structure comprised of a polymeric material, said polymeric material produced on a substrate disposed in a liquid precursor material for said polymeric material, portions of said liquid precursor material cured in a focal point of electromagnetic radiation wherein a wavelength of said radiation is about double a wavelength required to cure said liquid precursor material, wherein said cutting edge structure comprises a plurality of cutting edge elements extending linearly to form an extended cutting edge, wherein said precursor material is comprised of a monomer material, an oligomer material, or any combination thereof, and wherein a tip radius of said at least one cutting edge structure is less than 1 micrometer.

13. A blade box comprising:
   at least one cutting edge structure;
   at least one non-cutting edge structure coupled to said at least one cutting edge structure, both said cutting and non-cutting edge structures comprised of polymeric material, said polymeric material produced on a substrate disposed in a liquid precursor material for said polymeric material, portions of said liquid precursor material cured in a focal point of electromagnetic radiation wherein a wavelength of said radiation is about double a wavelength required to cure said liquid precursor material, wherein said precursor material is comprised of an acrylic based material, wherein said cutting edge structure comprises a plurality of cutting edge elements extending linearly to form an extended cutting edge and wherein a tip radius of said at least one cutting edge structure is less than 1 micrometer.

* * * * *